Nov. 27, 1951 D. NUDELL 2,576,532
WEEDLESS BAIT
Filed Oct. 30, 1947
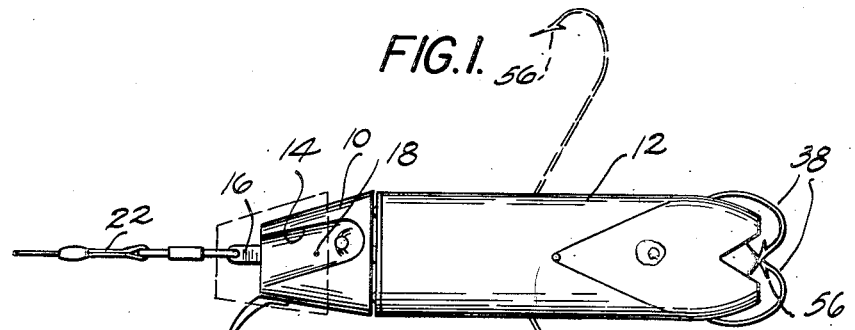
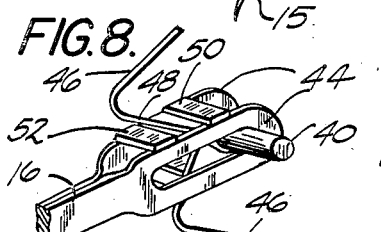
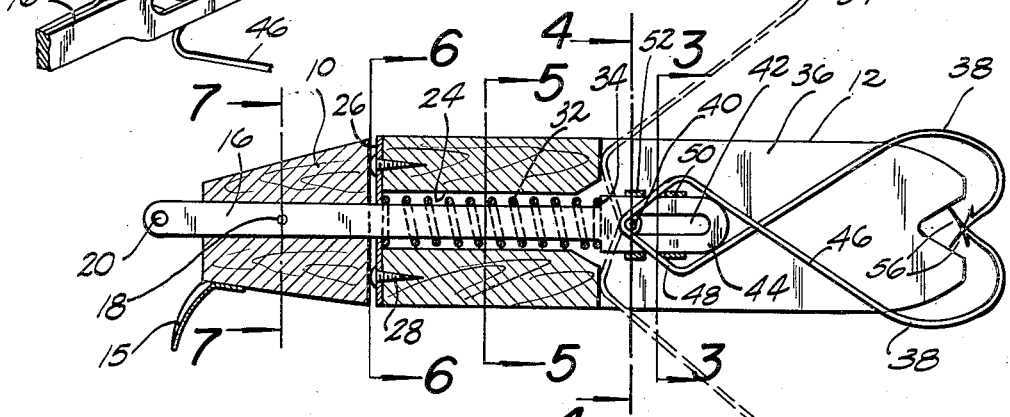
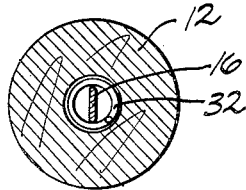
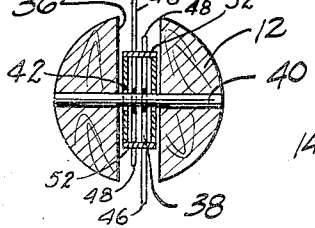
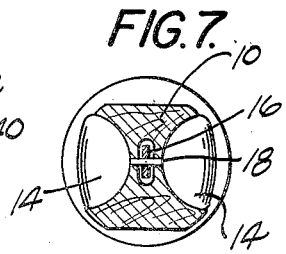
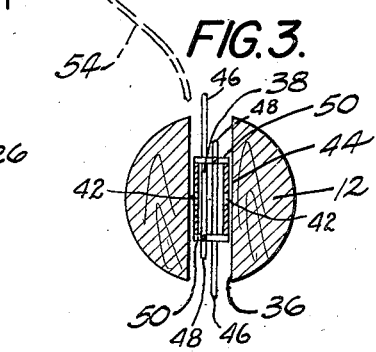
INVENTOR.
DEWEY NUDELL.
BY
ATTORNEYS.

Patented Nov. 27, 1951

2,576,532

UNITED STATES PATENT OFFICE 2,576,532

WEEDLESS BAIT

Dewey Nudell, Flint, Mich.

Application October 30, 1947, Serial No. 782,977

1 Claim. (Cl. 43—35)

This invention relates to an artificial bait and more particularly to that type of bait commonly referred to as "weedless" bait.

It is an object of this invention to provide an artificial bait in the form of a plug having hooks thereon which are normally enclosed and shielded by the body of the plug and therefore unlikely to become entangled with weeds and the like as the bait is actuated through the water.

Another object of the invention resides in the provision of means for pivoting the hooks outwardly of the body of the bait whenever a fish strikes the bait from any angle. That is to say, the hooks are actuated outwardly of the body by the drag produced on the body by a fish striking it rather than by mechanical means on the surface of the plug which have to be struck by the fish in order to actuate the hooks.

A further object of the invention resides in the provision of means for automatically returning the hooks to the shielded position whenever the drag on the body of the bait is released so that if a fish strikes the bait and is not hooked for some reason the hooks will automatically return to their shielded position and the bait still possesses the attributes of the weedless bait.

A further object of the invention is to position hooks on the body of the bait such that a fish striking the bait will be hooked irrespective of the angle at which it strikes and irrespective of the portion of the bait which it strikes.

Other objects and improvements will become apparent from the following description and drawings in which:

Figure 1 is a side view of the bait showing the hooks in the shielded and extended positions.

Figure 2 is a longitudinal cross section of the bait shown in Figure 1.

Figure 3 is a sectional view taken along line 3—3 in Figure 2.

Figure 4 is a sectional view taken along line 4—4 in Figure 2 showing a manner in which the hooks are pivotally secured to the body of the bait.

Figure 5 is a sectional view taken along line 5—5 in Figure 2.

Figure 6 is a sectional view taken along line 6—6 in Figure 2.

Figure 7 is a sectional view taken along line 7—7 in Figure 2.

Figure 8 is a perspective view of a portion of the hook actuation mechanism.

Referring now to the drawings, and particularly to Figure 1 there is shown an artificial bait, commonly referred to as a plug, embodying the present invention. The plug preferably comprises a head portion 10 and a body portion 12 which when joined together and actuated through water simulate a moving fish which attracts larger fish. The plug is preferably circular in cross section and is provided with various means to impart a zig zag movement to the plug under water. These means may be in the form of upwardly inclined grooves 14 at each side of head 10 and a curved spoon 15 projecting from the lower front end of the head. The present invention is not directed to the external contour of the plug, however, and accordingly the plug may be of any shape desired which will attract fish and induce them to strike.

Head 10 and body 12 are connected together by means of an actuator arm 16 which extends axially through the head and is fixed thereto by a pin 18. Arm 16 is non-circular in cross section and, as is more clearly shown in Figure 2, is preferably in the form of a flat metal strip having an eyelet 20 at its front end for attaching a fish line 22 to the plug. The rear portion of arm 16 extends through an axial hole 24 in the body 12. At its front end the body 12 is covered by an end plate 26 which is fixed to the body by screws 28. Arm 16 extends through an aperture 30 in plate 26 which conforms in shape to the cross section of arm 16 so as to prevent rotation of the head and body relative to each other. A compression spring 32 encircles the portion of arm 16 within body 12 with its front end bearing against plate 26 and its rear end against a shoulder 34 on arm 16 so as to urge head 10 and body 12 towards each other. Spring 34 is rather sensitive so that if a fish strikes the body 12 while the bait is being pulled through the water the spring will be compressed and the head and body portions will be separated. That is to say, spring 34 is sufficiently resilient so that any drag on the body 12 caused by a fish striking it will permit arm 16 to move outwardly of the body.

The rear portion of body 12 is slotted longitudinally through the central portion thereof as at 36. Slot 36 communicates with hole 24. A pair of hooks 38 are pivoted in the body 12 within slot 36 on a pin 40 which extends transversely through the central portion of the body at the forward end of the slot. Pin 40 also extends through longitudinal slots 42 in a pair of transversely spaced brackets 44 which form a yoke at the rear end of arm 16. Hooks 38 are L-shaped having comparatively long leg portions 46 adjacent the hook end and shorter leg portions 48 adjacent the pivoted end. Brackets 44 are provided at their upper and lower edges with pairs of longitudinally spaced shoulders 50 and 52 between which the shorter leg 48 of hooks 38 extend. Hooks 38 are loosely pivoted on pin 40 so that when yoke 44 moves forwardly on pin 40 shoulders 50 abut against the leg portions 48 and pivot the hooks in opposite directions outwardly of body 12 to the position indicated by broken lines 54. Likewise, when yoke 44 travels rearwardly in slot 36 the hooks are engaged by shoulders 52 and pivoted so that their hook ends 56 are disposed in crossed relation at the rear end of slot 36. The extent of axial movement of yoke 44 within body 12 is controlled by the length of slot 42 and shoulders 50 and 52 are arranged such that the hooks 38 are pivoted to the respective positions shown when yoke 44 moves from one axial extremity to the other.

In operation, when the plug is drawn through the water the hooks remain in the shielded position since spring 32 is strong enough to resist the pull of the line on the head 10 of the plug. Body 12 preferably has a smooth outer contour so that no obstructions are provided which might engage with weeds or the like in the water and thereby actuate hooks 38. However, when a fish strikes the body 12 at any point it will necessarily exert a drag on the line which compresses spring 32 and causes the body 12 to slide rearwardly on arm 16. Hooks 38 are thereby engaged by shoulders 50 and pivoted outwardly to snag the fish. If for some reason a fish strikes but releases the bait before being hooked, spring 32 urges the head 10 and body 12 together again and in so doing the hooks are engaged by shoulders 52 and pivoted to their shielded position within slot 36.

It will thus be seen that I have provided a weedless bait which is simple but nevertheless very effective. Whenever a fish strikes the bait and offers any resistance to the pull of the line, the head and body portions of the bait are separated and the hooks automatically swing outwardly from their shielded position to snag the fish. The hooks are actuated in this manner irrespective of the angle from which the fish strikes and regardless of what part of the body the fish strikes. It will also be observed that by arranging the hooks so as to pivot outwardly towards the center of the bait, a fish striking any part of the body will become entangled with the hooks.

I claim:

An artificial bait comprising an elongate body having a longitudinally extending slot at its rear end and a bore at its front end communicating with said slot, a pin fixed on said body and extending transversely across said slot in alignment with said bore, a pair of hooks each having a hook portion at one end and being pivotally supported at the other end on said pin, said hooks each being bent at a point intermediate said hook portion and said pivotally supported end to provide a pair of angularly related leg portions on each hook, said hooks being normally disposed in an inoperative position within said slot with the leg portions adjacent said pivotally supported ends extending from said pin in diverging directions generally transversely of the axis of said bore and with the other leg portions extending from said points of bending in converging directions and crossing each other at a point intermediate the ends of said other leg portions, an actuator movably mounted in said bore and having a frame at the rear end thereof disposed within said slot, said frame slidably engaging said pin and having a pair of openings therein aligned in a direction transversely of the longitudinal axis of said actuator, said leg portions adjacent said pivotally supported ends of said hooks extending one each through said openings and being slidably engaged with the edges of said openings such that, when said actuator is shifted in a direction forwardly of said body, said leg portions adjacent said pivotally supported ends of said hooks are pivotally actuated on said pins from said inoperative position to an operative position wherein they diverge to a greater extent than in said inoperative position and wherein said leg portions adjacent said hook portions are pivoted outwardly of said slot, and a spring member on said actuator positioned within said bore and tending to shift said actuator in a direction rearwardly of said body.

DEWEY NUDELL.

REFERENCES CITED

The following references are of record in the file of this patent:

UNITED STATES PATENTS

| Number | Name | Date |
| --- | --- | --- |
| 463,519 | Lagerstedt | Nov. 17, 1891 |
| 1,385,536 | Gleason | July 26, 1921 |
| 1,430,642 | Gross | Oct. 3, 1922 |
| 1,639,766 | Fisher | Aug. 23, 1927 |
| 1,994,878 | Smith | Mar. 19, 1935 |

FOREIGN PATENTS

| Number | Country | Date |
| --- | --- | --- |
| 4,146 | Great Britain | of 1881 |